US011474807B1

(12) United States Patent
Huang

(10) Patent No.: US 11,474,807 B1
(45) Date of Patent: Oct. 18, 2022

(54) FIRMWARE UPDATE METHOD AND COMPUTER PROGRAM PRODUCT FOR UPDATING FIRMWARE

(71) Applicant: American Megatrends International, LLC, Norcross, GA (US)

(72) Inventor: Shih-Hsuan Huang, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 17/218,874

(22) Filed: Mar. 31, 2021

(51) Int. Cl.
G06F 8/65 (2018.01)
G06F 16/11 (2019.01)
G06F 8/61 (2018.01)

(52) U.S. Cl.
CPC ............ *G06F 8/65* (2013.01); *G06F 8/63* (2013.01); *G06F 16/128* (2019.01)

(58) Field of Classification Search
CPC ............ G06F 8/65; G06F 8/63; G06F 16/128
See application file for complete search history.

(56) References Cited

U.S. PATENT DOCUMENTS

| 8,543,665 B2* | 9/2013 | Ansari | H04L 12/2814 |
| | | | 709/219 |
| 9,898,354 B2* | 2/2018 | Engel | G06F 9/44536 |
| 10,051,041 B2* | 8/2018 | Reddy | G06F 9/4408 |
| 10,313,479 B2* | 6/2019 | Lochhead | H04L 41/5009 |
| 11,243,782 B2* | 2/2022 | Bulusu | G06F 11/1441 |
| 2015/0169310 A1* | 6/2015 | Lee-Baron | G06F 8/65 |
| | | | 717/170 |

(Continued)

FOREIGN PATENT DOCUMENTS

| CN | 111638943 A * | 9/2020 | ............ G06F 21/53 |
| EP | 3835987 A1 * | 6/2021 | ......... G06F 16/2379 |

(Continued)

OTHER PUBLICATIONS

Inagaki et al., "Container Management as Emerging Workload for Operating Systems", 2016, IEEE (Year: 2016).*

(Continued)

*Primary Examiner* — Qing Chen
*Assistant Examiner* — Junchun Wu
(74) *Attorney, Agent, or Firm* — Birch, Stewart, Kolasch & Birch, LLP

(57) ABSTRACT

A firmware update method and computer program product for updating firmware are provided. The method includes: generating a plurality of container files each corresponding to a hardware device among a plurality of hardware devices coupled to a computing system, wherein each container file includes a firmware update utility to be installed on the computing system to update a firmware installed on the corresponding hardware device; generating an image file of the computing system, wherein the image file has a container layer including the plurality of container files; booting the computing system using the image file, wherein the container files are executed consecutively; installing the firmware update utility of each container file on the computing system when each one of the container files is executed; and for each of the hardware devices, installing a firmware image thereon using the corresponding firmware update utility installed on the computing system.

10 Claims, 5 Drawing Sheets

(56) References Cited

U.S. PATENT DOCUMENTS

| | | | | |
|---|---|---|---|---|
| 2017/0264684 A1* | 9/2017 | Spillane | | G06F 9/45558 |
| 2018/0287883 A1* | 10/2018 | Joshi | | G06F 9/455 |
| 2019/0171436 A1* | 6/2019 | Shivanna | | G06F 8/65 |
| 2019/0303185 A1* | 10/2019 | Paithankar | | G06F 8/65 |
| 2019/0312800 A1* | 10/2019 | Schibler | | H04L 41/0823 |
| 2019/0354389 A1* | 11/2019 | Du | | G06F 9/45545 |
| 2022/0147350 A1* | 5/2022 | Lochhead | | H04L 41/0895 |

FOREIGN PATENT DOCUMENTS

| | | | | |
|---|---|---|---|---|
| EP | 3353651 B1 * | 4/2022 | | G06F 8/65 |
| WO | WO-2017013134 A1 * | 1/2017 | | G05B 19/00 |

OTHER PUBLICATIONS

Goldschmidt et al., "Container-based architecture for flexible industrial control applications", 2018, Elsevier B.V. (Year: 2018).*

Ahmed et al., "Efficient Container Deployment in Edge Computing Platforms", 2017, RESCOM (Year: 2017).*

Zhao et al., "Large-Scale Analysis of Docker Images and Performance Implications for Container Storage Systems", 2020, IEEE (Year: 2020).*

* cited by examiner

FIRMWARE UPDATE METHOD AND COMPUTER PROGRAM PRODUCT FOR UPDATING FIRMWARE

FIELD OF THE INVENTION

The present invention relates to method and computer program product for updating firmware, and more particularly to method and computer program product for updating a plurality of firmware.

BACKGROUND

Firmware updates for hardware devices in computer systems are needed for reasons such as fixing defects in an existing version of firmware, or adding additional functions to the existing version of firmware.

Conventionally, updating firmware of multiple hardware devices on a single computer system can be a time-consuming and repetitive task, since the libraries and operating system compatible with one firmware update utility of a hardware device may not be incompatible with that of another. In other words, when updating multiple firmware in the prior art, it is required to constantly change the operating system when installing different update utilities.

Therefore, there is a need in the art to provide improved techniques for updating firmware of multiple hardware devices.

SUMMARY

Accordingly, one of the objectives of the present invention is to provide a method and a computer program product for updating multiple firmware in a fast and convenient way.

In order to achieve the aforementioned objective, one embodiment of the present invention provides a firmware update method including: generating a plurality of container files each corresponding to a hardware device among a plurality of hardware devices coupled to a computing system, wherein each container file includes a firmware update utility to be installed on the computing system to update a firmware installed on the corresponding hardware device; generating an image file of the computing system, wherein the image file has a container layer including the plurality of container files; booting the computing system using the image file, wherein the container files are executed consecutively; installing the firmware update utility of each container file on the computing system when each one of the container files is executed; and for each of the hardware devices, installing a firmware image thereon using the corresponding firmware update utility installed on the computing system.

In one aspect, each container file further includes a set of libraries to be used when installing the firmware update utility in the same container file.

In one aspect, each container file further includes the firmware image that is to be installed on the corresponding hardware device.

In one aspect, the image file includes a kernel layer having a plurality of kernel modules, and a driver layer having a plurality of driver modules, wherein the step of booting the computing system using the image file wherein the plurality of container files are executed consecutively further includes: loading a first container file of the plurality of container files into a first portion of a memory unit of the computing system; loading one of the kernel modules on which the firmware update utility of the first container file is supported into the first portion of the memory unit; loading one of the driver modules that is configured for the firmware update utility in the first container file into the first portion of the memory unit; and executing the first container file based on the first portion of the memory unit.

In one aspect, the method further comprises: when executing the first container file, preloading a second container file of the plurality of container files into a second portion of the memory unit of the computing system; preloading one of the kernel modules that is configured for the firmware update utility in the second container file into the second portion of the memory unit; preloading one of the driver modules that is configured for the firmware update utility in the second container file into the second portion of the memory unit; assigning a virtual hardware device corresponding to the second container file to the second portion of the memory unit; after executing the first container file based on the first portion of the memory unit, mapping a second hardware device of the plurality of hardware devices corresponding to the second container file to the virtual hardware device; and executing the second container file based on the second portion of the memory unit.

In one aspect, each container file further includes a driver update package that is to be installed on the computing system, wherein the driver update package updates a driver module on the computing system through which the computing system communicates with the corresponding hardware device.

Another embodiment of the present invention provides a computer program product embodied on a non-transitory computer readable medium. The computer program product includes code for generating a plurality of container files each corresponding to a hardware device among a plurality of hardware devices coupled to a computing system, wherein each container file includes a firmware update utility to be installed on the computing system to update a firmware installed on the corresponding hardware device; code for generating an image file of the computing system, wherein the image file has a container layer including the plurality of container files; code for booting the computing system using the image file, wherein the container files are executed consecutively; code for installing the firmware update utility of each container file on the computing system when each one of the container files is executed; and code for installing a firmware image on the corresponding hardware device using the firmware update utility installed on the computing system.

In order to further the understanding of the present disclosure, reference is made to the following detailed description illustrating the embodiments and examples of the present disclosure. The description is for illustrative purpose only and is not intended to limit the scope of the claim.

DETAILED DESCRIPTION OF EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

The firmware update method and computer program product provided by one embodiment of the present invention will be described below with reference to FIG. 1 to FIG. 6. First, referring to FIG. 1, the firmware update method includes at least the following steps: step S100: generating a plurality of container files each corresponding to a hardware device among a plurality of hardware devices coupled to a computing system, wherein each container file includes a firmware update utility to be installed on the computing system to update a firmware installed on the corresponding hardware device; step S102: generating an image file of the computing system, wherein the image file has a container layer including the plurality of container files; step S104: booting the computing system using the image file, wherein the container files are executed consecutively; step S106: installing the firmware update utility of each container file when each one of the container files is executed; and step S108: for each of the hardware devices, installing a firmware image thereon using the firmware update utility installed on the computing system.

Figure 2:
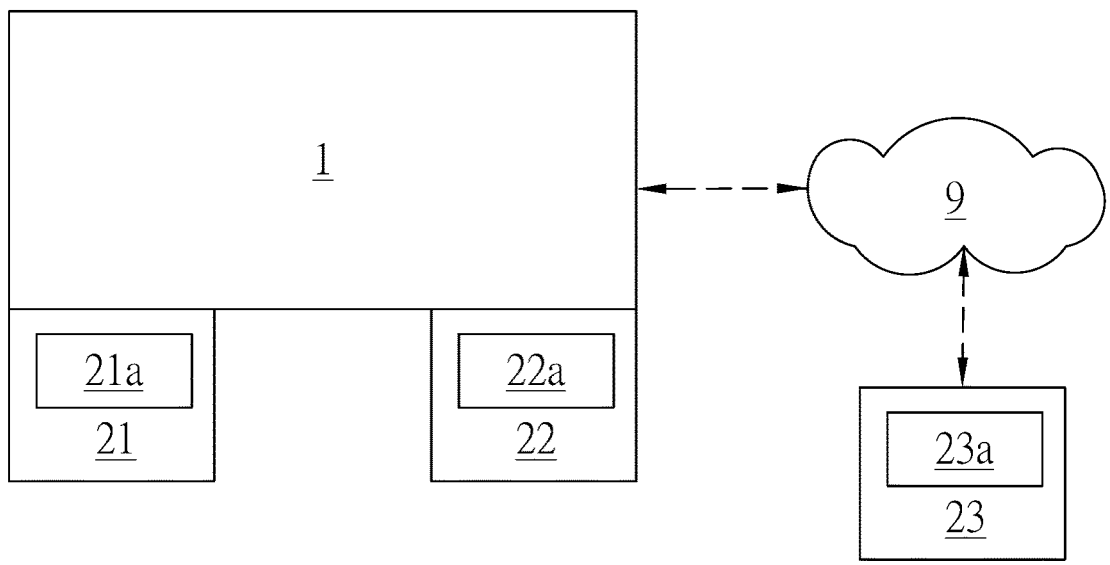
FIG. 2 is a functional block diagram illustrating a computing system and a plurality of hardware devices coupled thereto according to one embodiment of the present invention.

Referring to FIG. 2, which shows an embodiment of the computing system 1 and the hardware devices 21~23 connected thereto. The computing system 1 can be any computational device known in the art, such as a notebook, a personal computer, a server, etc. The hardware devices 21~23 can be any type of hardware devices such as a disk drive, a printer, an optical disk drives coupled to the computing system 1. The computing system 1 can be connected to the hardware devices 21~23 through a physical connection such as direct lines, common bus systems or wirelessly through a network. In this embodiment, hardware devices 21~22 are coupled to the computing system 1 through physical connection, and hardware device 23 is coupled to the computing system 1 through a network 9.

As shown in FIG. 2, the hardware devices 21~23 contains firmware 21*a*~23*a* respectively. In step S100, with reference to FIG. 3, a plurality of container files 31~33 are generated, each having a firmware update utility to be installed on the computing system 1. More specifically, the container file 31 includes firmware update utility 31*a* configured to update the firmware 21*a*; the container file 32 includes firmware update utility 32*a* configured to update the firmware 22*a*; the container file 33 includes firmware update utility 33*a* configured to update the firmware 23*a*.

In the present embodiment, each container file 31~33 can further include a firmware image 31*b*~33*b* and a set of libraries 31*c*-33*c* respectively. The firmware images 31*b*~33*b* are binary files to update the firmware 21*a*~23*a* respectively. After the firmware update utility 31*a*~33*a* is installed on the computing system 1, firmware update can be performed by executing the firmware images 31*b*~33*b* on the hardware devices 21~23 using the firmware update utility 31*a*~33*a*.

Figure 1:
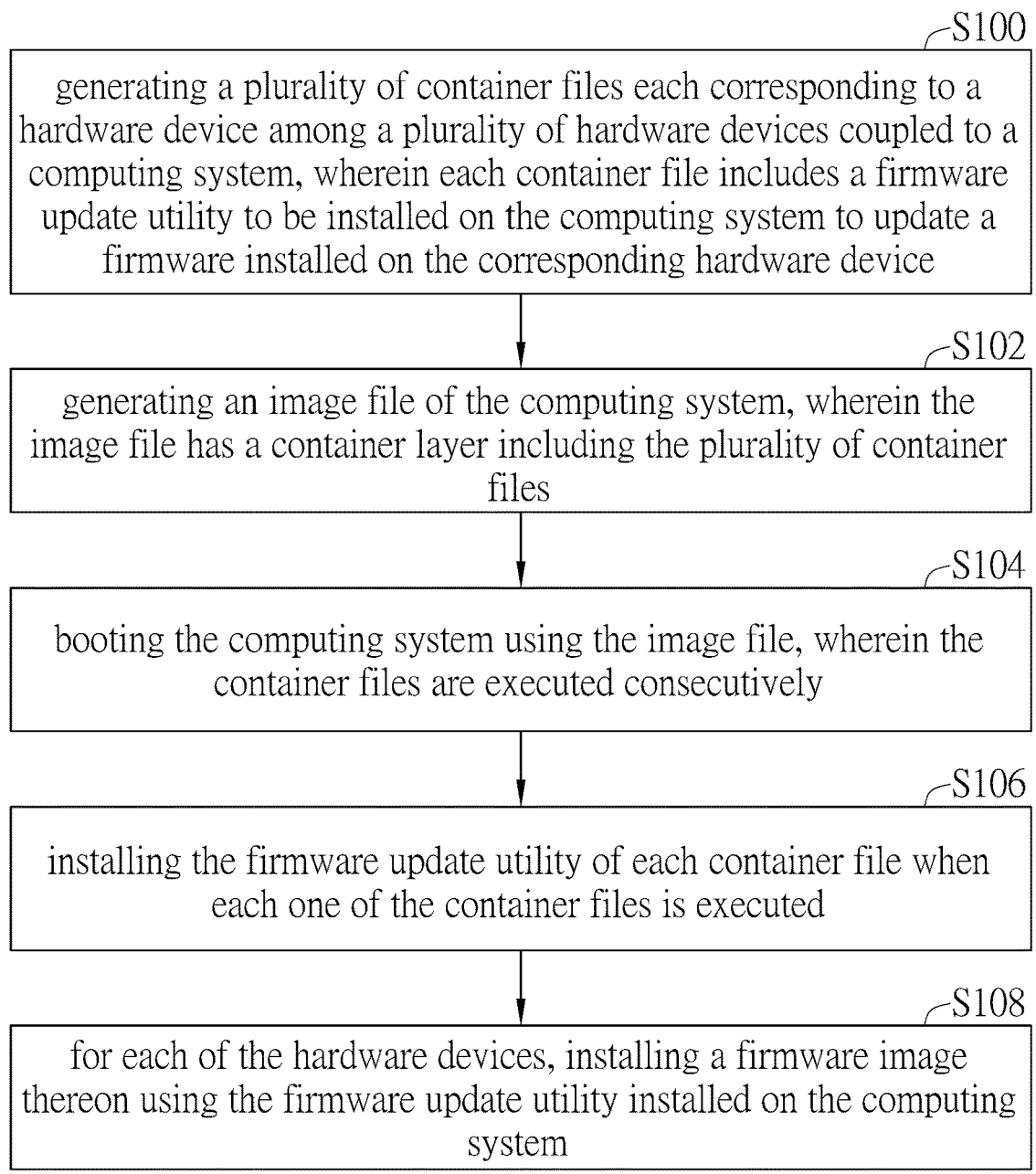
FIG. 1 is a flow chart illustrating a firmware update method according to one embodiment of the present invention.
Figure 3:
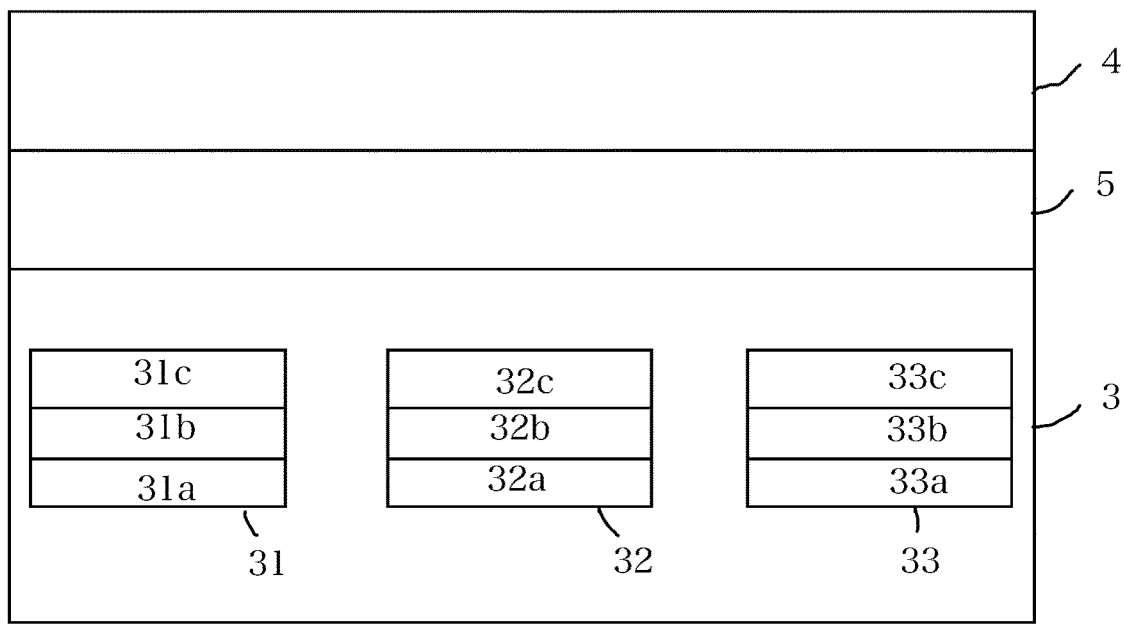
FIG. 3 is a schematic architecture illustrating the image file of the computing system according to one embodiment of the present invention.

With reference to FIG. 1 and FIG. 3, in step S102, an image file E of the computing system 1 is generated. The image file E includes a container layer 3 having the container files 31~33 created in step S100. More specifically, the image file E is a bootable image file with which the computing system 1 boots or reboots itself, wherein the image file E further includes a kernel layer 4 and a driver layer 5. In step S104, the image file E is used to boot the computing system 1, thereby loading the container layer 3 onto the computing system 1. Through the abovementioned technical solution, the container files 31~33 can be executed consecutively and the firmware update utility 31*a*~33*a* can be installed on the computing system 1 as a result (step S106).

In step S108, the firmware images 31*b*~33*b* are installed on the hardware devices 21~23 respectively using the firmware update utilities 31*a*~33*a* respectively, thereby updating the firmware 21*a*~23*a* of the hardware devices 21~23. In this embodiment, the specific libraries that are used when running a firmware update utility are included in the container file. For example, the set of libraries 31*c* are used by the firmware update utility 31 when the firmware update utility 31 is installed on the computing system 1, and when the firmware update utility 31 is used to install the firmware image 31*b* on the hardware device 21. In this embodiment, the libraries 31*c* and the firmware image 31*b* are included in the container file 31 when generating the container file 31. However, the present invention is not limited thereto. For example, in other embodiments, the libraries 31*c* and the firmware image 31*b* can be downloaded over a network to the computing system 1 beforehand. It should also be noted that, although only three hardware devices 21~23 are depicted in the present embodiment (hence corresponding three container files 31~33), the present invention is not limited thereto. In other embodiments, the number of hardware devices can be more than or less than three.

Through the abovementioned solution, the present embodiment achieves fast and convenient firmware update by updating firmware 21*a*~23*a* in a single process of booting the computing system 1 with the image file E. Since the firmware update utilities 31*a*~33*a* needed to update firmware 21*a*~23*a* are packaged respectively into a container, the firmware update utilities 31*a*~33*a* can be installed and used to install the firmware images 31*b*~33*b* consecutively by just booting the computing system 1 with the image file E without further manual operation or input. For example, in step S108, after the firmware image 31*b* is installed on the hardware device 21 using the firmware update utility 31*a*, the computing system 1 automatically proceeds to execute container file 32, in which the firmware update utility 32*a* is installed and used to install the firmware image 32*b* on the hardware device 22.

More specifically, referring to FIC. 4, in one embodiment of the present invention, the firmware update method further includes step S200: loading a first container file of the plurality of container files into a first portion of a memory unit of the computing system; step S202: loading one of the kernel modules that is configured for the firmware update utility in the first container file into the first portion of the memory unit; step S204: loading one of the driver modules that is configured for the firmware update utility in the first container file into the first portion of the memory unit; and step S206: executing the first container file based on the first portion of the memory unit.

Figure 4:
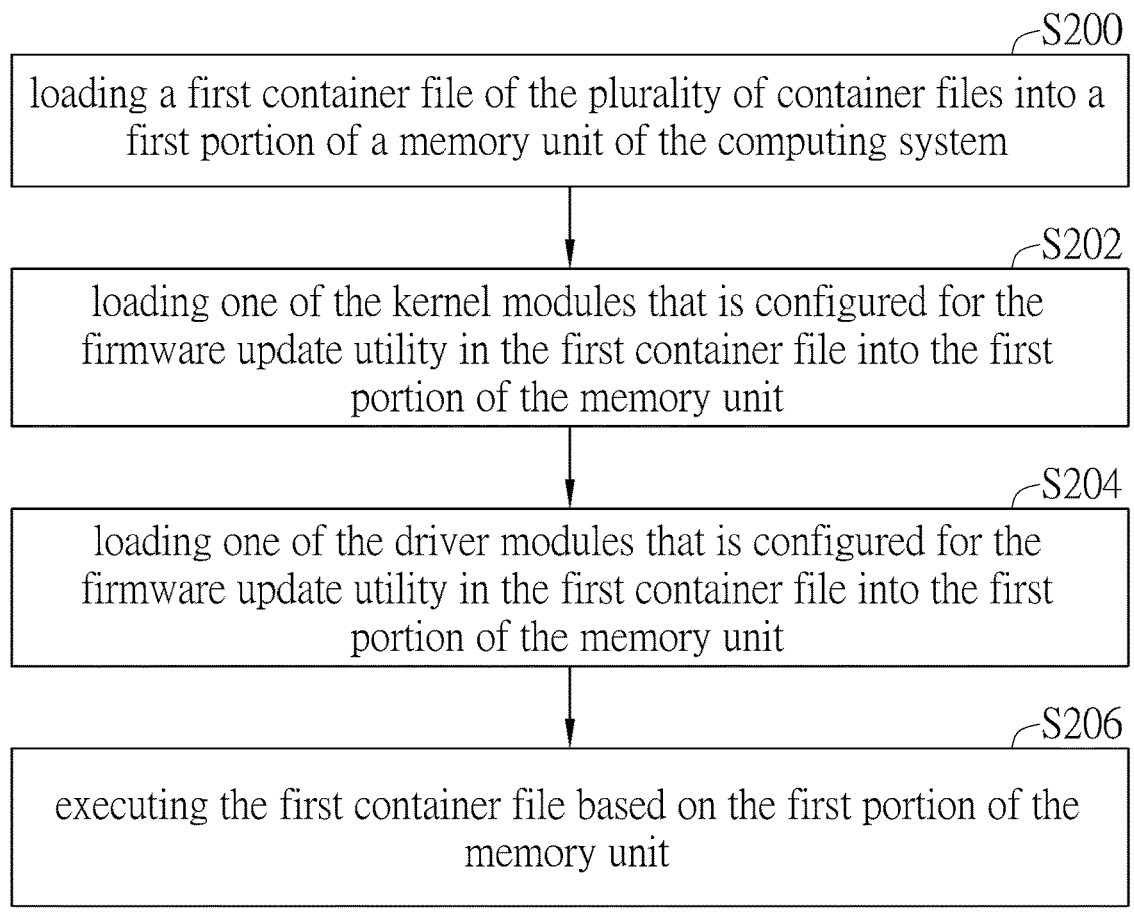
FIG. 4 is flow chart illustrating the firmware update method according to one embodiment of the present invention.
Figure 5:
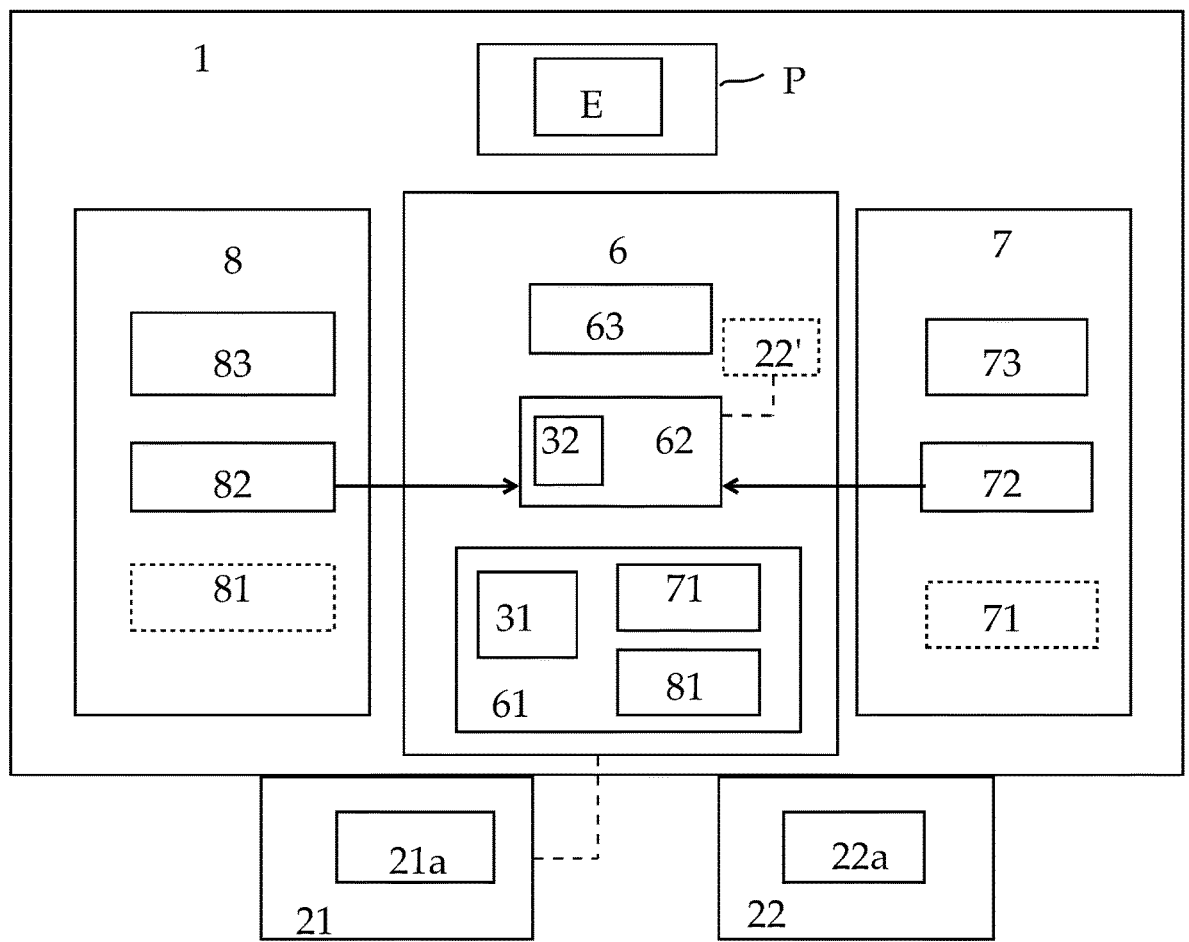
FIG. 5 is a functional block diagram illustrating preloading a second container file according to one embodiment of the present invention.

FIG. 3 and FIG. 5 will be used to describe the method of FIG. 4 below. Referring to FIG. 3, in the present embodiment, the kernel layer 3 and the driver layer 4 are each shown to be one single layer to illustrate the fact that the kernel modules and the driver modules already existing in the computing system 1 are not updated, as opposed to the firmware. In the functional block diagram of FIG. 5, it is shown that the kernel layer 7 existing in the computing system 1 of the present embodiment includes at least kernel modules 71~72, in which the kernel module 71 is supported by the firmware update utility 31a; the kernel module 72 is supported by the firmware update utility 32a; the kernel module 73 is supported by the firmware update utility 33a. Similarly, the driver layer 8 existing in the computing system 1 includes driver modules 81~83, in which the driver module 81 is configured for the firmware update utility 31a; the driver module 82 is configured for the firmware update utility 32a; the driver module 83 is configured for the firmware update utility 33a.

Referring to FIG. 5, for example, when the image file E is run by the processor P of the computing system 1, the first container file 31 is loaded into a first portion 61 of the memory unit 6 (step S200). Thereafter, the kernel module 71 and the driver module 81 are unloaded to be open in the first portion 61 (step S202 and step S204), and then the first container file 31 is executed base on the first portion 61 of the memory unit 6, in which the firmware image in the first container file 31 is installed on the hardware device 21 and the firmware 21a is updated.

More specifically, in the present embodiment, the modules in the computing system 1 that do not need updates remain unpackaged in the image file. However, the present invention is not limited thereto. For instance, in other embodiments, the driver modules 81~83 can be included in the container files 3133 respectively if the driver modules need to be updated.

Figure 6:
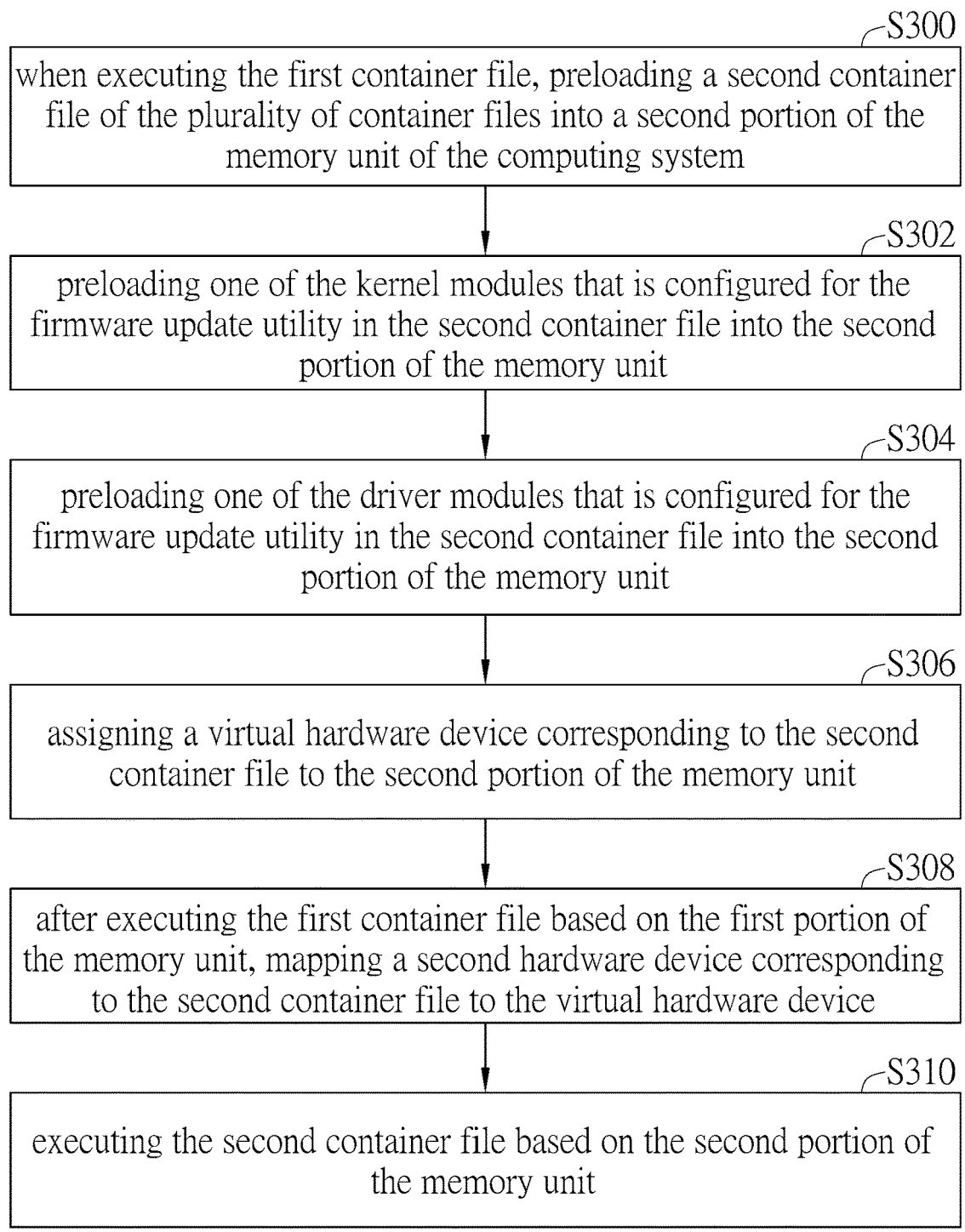
FIG. 6 is a flow chart illustrating the method for executing the second container file according to one embodiment of the present invention.

Referring to FIG. 5 and FIG. 6, in one embodiment of the present invention, the firmware update method further includes step S300: when executing the first container file 31, preloading a second container file 32 of the plurality of container files into a second portion 62 of the memory unit 6 of the computing system 1; step S302: preloading one of the kernel modules 72 that is configured for the firmware update utility 32a in the second container file 32 into the second portion 62 of the memory unit 6; step S304: preloading one of the driver modules 82 that is configured for the firmware update utility 32a in the second container file 32 into the second portion 62 of the memory unit 6; step S306: assigning a virtual hardware device 22' corresponding to the second container file 32 to the second portion 62 of the memory unit 6; step S308: after executing the first container file 31 based on the first portion 61 of the memory unit 6, mapping a second hardware device 22 corresponding to the second container file 32 to the virtual hardware device 22'; and step S310: executing the second container file 32 based on the second portion 62 of the memory unit 6.

Specifically, FIG. 5 illustrates when the second container file 32 has been loaded into the second portion 62 of the memory unit 6 and the kernel model 72 and the driver module 82 are to be loaded to the second portion 62 as well. In step S306, a virtual hardware device 22' is assigned to the second portion 62 of the memory unit 6 so that when the firmware 21a of the hardware device 21 has been updated, the computing system 1 proceeds with the second portion 62 directly and mapping the actual hardware device 22 whose firmware 22a is to be updated to the virtual hardware device 22'. Thereafter, the second container file 32 will be executed based on the second portion 62 of the memory unit 6. The same preloading process applies to the third container file 33 of FIG. 3 when the second container file 32 starts being executed.

Through the aforementioned solution, in which the consecutive preloading process and the assignment of virtual hardware device are performed for the container files that are to be executed next, consecutive execution of the container files can be achieved.

The descriptions illustrated supra set forth simply the embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A firmware update method, comprising:
generating a plurality of container files each corresponding to a hardware device among a plurality of hardware devices coupled to a computing system, wherein each container file includes a firmware update utility to be installed on the computing system to update a firmware installed on the corresponding hardware device;
generating an image file of the computing system, wherein the image file has a container layer including the plurality of container files;
booting the computing system using the image file, wherein the container files are executed consecutively;
installing the firmware update utility of each container file on the computing system when each one of the container files is executed; and
for each of the hardware devices, installing a firmware image thereon using the corresponding firmware update utility installed on the computing system;
wherein the image file includes a kernel layer having a plurality of kernel modules, and a driver layer having a plurality of driver modules, wherein the booting the computing system using the image file wherein the plurality of container files are executed consecutively further includes:
loading a first container file of the plurality of container files into a first portion of a memory unit of the computing system;
loading one of the kernel modules on which the firmware update utility of the first container file is supported into the first portion of the memory unit;
loading one of the driver modules that is configured for the firmware update utility of the first container file into the first portion of the memory unit; and executing the first container file based on the first portion of the memory unit.

2. The method according to claim 1, wherein each container file further includes a set of libraries to be used when installing the firmware update utility in the same container file.

3. The method according to claim 1, wherein each container file further includes the firmware image that is to be installed on the corresponding hardware device so as to update the firmware thereon.

4. The method according to claim 1, further comprising:
when executing the first container file, preloading a second container file of the plurality of container files into a second portion of the memory unit of the computing system;
preloading one of the kernel modules that is configured for the firmware update utility in the second container file into the second portion of the memory unit;
preloading one of the driver modules that is configured for the firmware update utility in the second container file into the second portion of the memory unit;
assigning a virtual hardware device corresponding to the second container file to the second portion of the memory unit;
after executing the first container file based on the first portion of the memory unit, mapping a second hardware device of the plurality of hardware devices corresponding to the second container file to the virtual hardware device; and
executing the second container file based on the second portion of the memory unit.

5. The method according to claim 1, wherein one of the container files further includes a driver update package that is to be installed on the computing system, wherein the driver update package updates a driver module on the computing system through which the computing system communicates with the corresponding hardware device.

6. A computer program product for use with a computer, the computer program product comprising a non-transitory computer readable medium having a computer readable program code embodied therein for updating firmware, the computer readable program code performing:
generating a plurality of container files each corresponding to a hardware device among a plurality of hardware devices coupled to a computing system, wherein each container file includes a firmware update utility to be installed on the computing system to update a firmware installed on the corresponding hardware device;
generating an image file of the computing system, wherein the image file has a container layer including the plurality of container files;
booting the computing system using the image file, wherein the container files are executed consecutively;
installing the firmware update utility of each container file on the computing system when each one of the container files is executed; and
for each of the hardware devices, installing a firmware image thereon using the corresponding firmware update utility installed on the computing system;
wherein the image file includes a kernel layer having a plurality of kernel modules, and a driver layer having a plurality of driver modules, wherein in the computer readable program code that performs booting the computing system using the image file wherein the plurality of container files are executed consecutively, the computer readable program code further performs:
loading a first container file of the plurality of container files into a first portion of a memory unit of the computing system;
loading one of the kernel modules on which the firmware update utility of the first container file is supported into the first portion of the memory unit;
loading one of the driver modules that is configured for the firmware update utility of the first container file into the first portion of the memory unit; and executing the first container file based on the first portion of the memory unit.

7. The computer program product according to claim 6, wherein each container file further includes a set of libraries to be used when installing the firmware update utility of the same container file.

8. The computer program product according to claim 6, wherein each container file further includes the firmware image that is to be installed on the corresponding hardware device.

9. The computer program product according to claim 6, wherein the computer readable program code further performs:
preloading a second container file of the plurality of container files into a second portion of the memory unit of the computing system when executing the first container file;
preloading one of the kernel modules on which the firmware update utility of the second container file is supported into the second portion of the memory unit;
preloading one of the driver modules that is configured for the firmware update utility of the second container file into the second portion of the memory unit;
assigning a virtual hardware device corresponding to the second container file to the second portion of the memory unit;
after executing the first container file based on the first portion of the memory unit, mapping a second hardware device of the plurality of hardware devices corresponding to the second container file to the virtual hardware device; and executing the second container file based on the second portion of the memory unit.

10. The computer program product according to claim 6, wherein each container file further includes a driver update package that is to be installed on the computing system, wherein the driver update package is configured to update a driver module on the computing system through which the computing system communicates with the corresponding hardware device.

* * * * *